March 17, 1959
M. BAASEN
2,877,857
PLOW ATTACHMENT
Filed Aug. 8, 1955
2 Sheets-Sheet 1
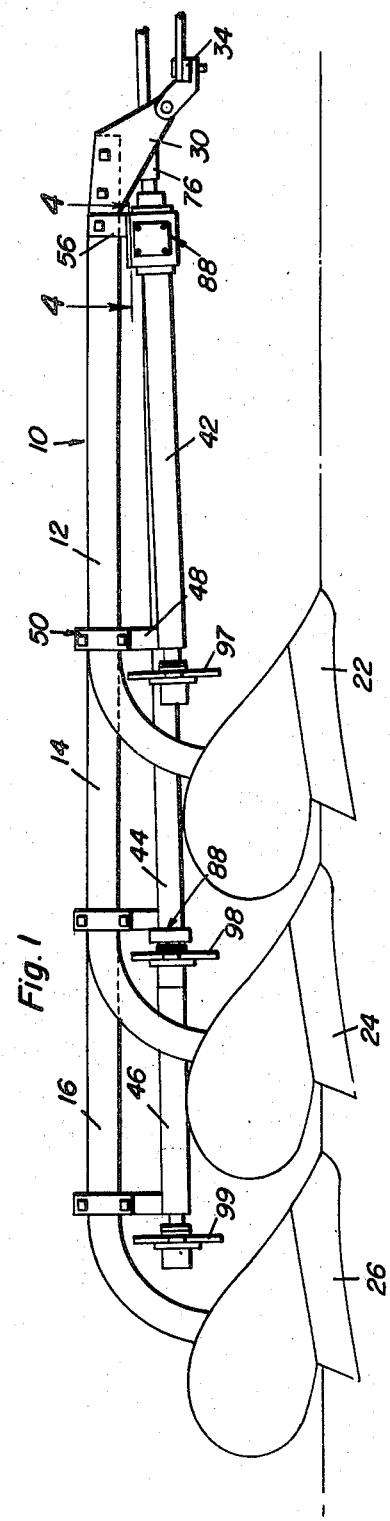
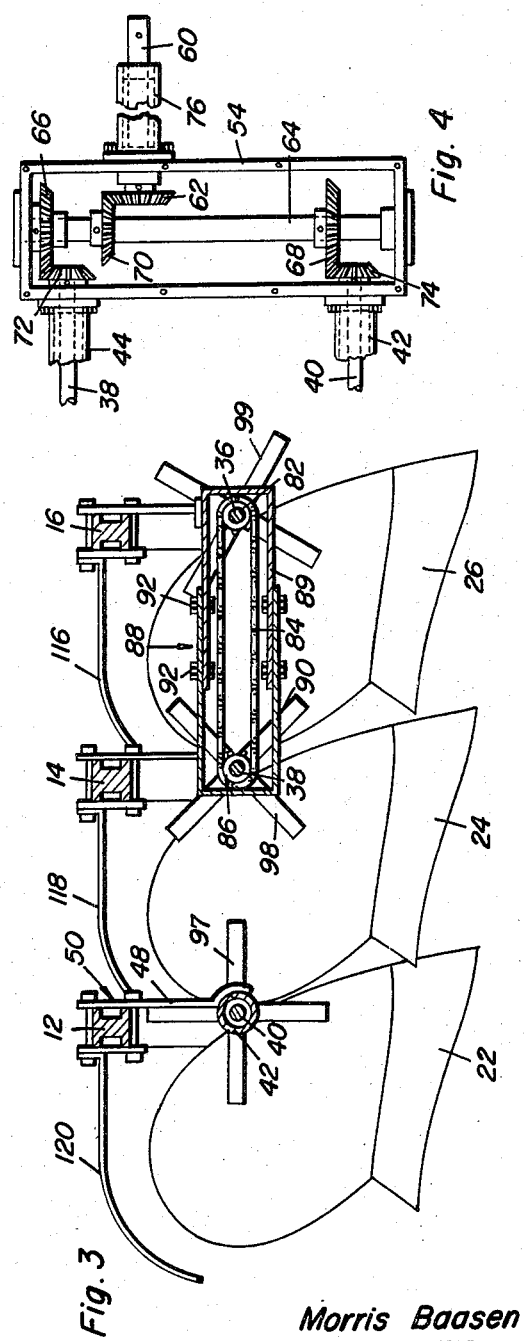
Morris Baasen
INVENTOR.

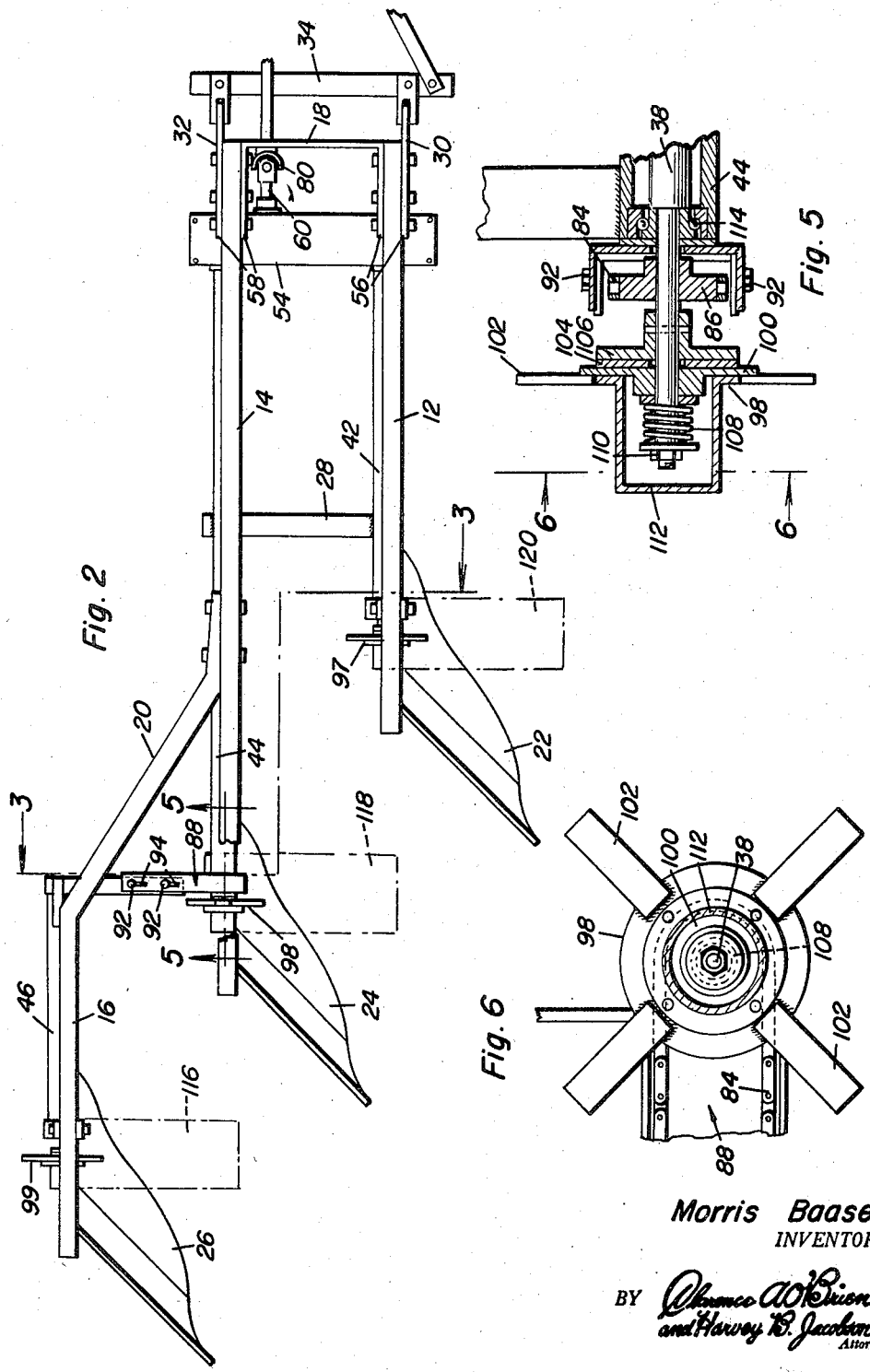

United States Patent Office 2,877,857
Patented Mar. 17, 1959

2,877,857

PLOW ATTACHMENT

Morris Baasen, Wendell, Minn.

Application August 8, 1955, Serial No. 526,867

2 Claims. (Cl. 97—35)

This invention relates to improvements in plow attachments and particularly to a rotary chopper which increases the efficiency of the farmer in plowing his field.

The purpose of this invention is through revolving motion of a number of hammers, to break up and/or remove corn stalks and straw from the immediate area between the plow beam and the plowshare, and to emulsify and break up the soil as it passes over the point of the plowshare. When plowing in cornstalks or straw, there is an invariable tendency on the part of these materials to accumulate, and as the accumulation grows it forces the plow beam upward, drawing the plowshare from the ground and causing a heavier pull, and sometimes even deflecting the course of the plow. Accordingly, a conscientious farmer when plowing in cornstalks or heavy straw is required either to stop frequently and dismount from the tractor to remove the accumulation, or he may set fire to the stalks and hay on the field and burn it beforehand. Either procedure is contrary to accepted conservation practices.

Accordingly, a further object of this invention is to provide an attachment for a plow which removes the cornstalks and straw by throwing them toward the plowed furrow, and while breaking down the fibrous material, also mix it with the soil. Not only does this overcome the difficulty of having accumulated soil and litter between the plowshares and the plow beam, but it also serves to better and more immediately utilize the cornstalks and straw as fertilizer.

Another and more specific object of the invention is to provide a multiple plow attachment of a specific construction, that is, with a shaft depending from each plow beam, together with means for rotating two of the plow beams simultaneously, preferably from power derived from the power take-off of a drawing tractor, and to have adjustable means between one of the two shafts and the third shaft in order to drive that third shaft.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

Figure 1 is a side view of a typical multiple plow in which the principles of the invention are applied;

Figure 2 is a top view of the structure in Figure 1, the deflection guards being omitted and shown in phantom in order to illustrate structure which would ordinarily be hidden therebelow;

Figure 3 is a staggered transverse sectional view taken substantially on the planes of line 3—3 of Figure 2 and in the direction of the arrows;

Figure 4 is an enlarged sectional detail taken substantially on the line 4—4 of Figure 1 and in the direction of the arrows;

Figure 5 is an enlarged fragmentary sectional view taken on the line 5—5 of Figure 2 and showing one of the clutches used to prevent damage to the hammer wheel in the event it strikes an obstruction; and Figure 6 is a sectional view taken substantially on the line 6—6 of Figure 5 and in the direction of the arrows.

In the accompanying drawings, there is a plow 10 of the multiple type having plow beams 12 and 14 which are substantially parallel and which are connected together by a cross member 18 at their forward ends. The plow beam 16 has an offset 20 at its forward end and is connected to the plow beam 14. The dimensions of the plow beams are such that the plowshares 22, 24 and 26 on plow beams 12, 14 and 16 are staggered. For additional strength and rigidity, cross-member 28 is secured to the plow beams 12 and 14 intermediate their forward and rear ends. Brackets 30 and 32 which are fastened to and depend from the forward ends of the plow beams 12 and 14 are adapted to be connected by standard means to a tractor drawbar 34, whence the plow 10 is drawn through a field to be plowed.

The plow attachment comprises three shafts 36, 38 and 40, respectively, which are mounted for rotation in housings 42, 44, and 46 which depend from the beams 12, 14 and 16. To mount each shaft housing, suitable brackets are used such as the bracket 48 which is welded or otherwise fixed at one end to the housing 42 and which is connected by a clamp 50 to the beam 12. Each bracket and clamp assembly, however, holds its shaft suspended below and approximately parallel to its beam.

Means for rotating all of said shafts 36, 38 and 40 in unison are provided on the attachment. The preferred means consist of a gear box 54 which extends across and is secured to the plow beams 12 and 14 by means of brackets 56 and 58. A drive shaft 60 adapted to be drivingly connected with the power take-off of a tractor is mounted for rotation in suitable bearings in the gear box 54 and has a gear 62 secured to it and disposed in the gear box 54. A lay shaft 64 is mounted in bearings in the gear box 54 and has gears 66 and 68 pinned, splined or otherwise connected to it so that they rotate in unison with the rotation of the shaft 64. In order to impart rotation to lay shaft 64, a gear 70 is secured to and is enmeshed with gear 62. Therefore, when the tractor power take-off is actuated, lay shaft 64 is rotated. Inasmuch as gears 66 and 68 are enmeshed with gears 72 and 74 on the ends of shafts 38 and 40, actuation of the tractor power take-off will cause a corresponding rotation in shafts 38 and 40. As noted in Figure 4, the shaft housings 42 and 44 are flanged at their ends and are bolted to the gear box 54. A similar shaft housing 76 together with a flange is used for the shaft 60. Moreover, in obtaining the motive power for the attachments, a universal joint 80 may be interposed in shaft 60 as found necessary or desirable.

In order to impart rotation to the shaft 36, there is a sprocket 82 secured to it at its forward end and a flexible drive, as chain 84, engaged with it. A sprocket 86 is secured to the shaft 38 and the chain 84 is also entrained around this sprocket. In order to help support the housing 46 of shaft 36 and protect chain 84 there is a casing 88 made of a pair of sections 89 and 90, respectively, the sections being of such dimensions as to be fitted in each other and connected. Bolts 92 passing through slots in the casing portions 89 and 90 hold the casing in the assembled position. This casing has the rear end of shaft housing 44 secured to it (Figure 5) and the forward end of housing 46 secured to it.

Hammer wheels 97, 98 and 99 respectively are secured at the rear ends of shafts 40, 38 and 36. Each hammer wheel is of identical construction, and therefore attention is invited to Figures 5 and 6 where the hammer wheel 98 is shown in detail. It comprises a pressure plate 100 axially slidable on the outer end of shaft 38 on which there are four generally radially extending arms 102 which constitute the hammers of the hammer wheel. A clutch lining 104 is fixed to the face of pressure plate 100 and is adapted to be brought into contact with the clutch plate 106. This clutch plate is pinned or otherwise fixed to the end of shaft 38 and is rotatable therewith. A spring 108 is concentrically disposed on the shaft 38 and bears against the pressure plate 100 maintaining it normally in engagement with the clutch plate 106. Nut 110 is threaded on the outer end of shaft 38 and by the use of washers behind it, the clutch pressure may be regulated. A dust shield 112 is secured to the front face of the plate 100 and protects the spring 108 from dust and dirt.

Shaft 38 is illustrated in Figure 5 as being mounted in an anti-friction bearing 114 and a reduced portion of shaft 38 protrudes from housing 44. This is the preferred construction for the rear end of each of the main shafts 36, 38, and 40.

Splash shields 116, 118, and 120, respectively, are secured to the plow beams 16, 14 and 12 (Figure 3) and extend over the hammer wheels in order to prevent the soil from being thrown upward during the operation of the attachment for the plow 10.

In operation, after the attachment is secured to the plow and connected to the tractor power take-off, the plow is drawn through the field by the tractor. Upon actuation of the power take-off, each of the shafts 36, 38 and 40, respectively, is rotated in accordance with the speed of the tractor power take-off. This rotation causes the hammer wheels 97, 98 and 99, respectively, to be rotated in the region where accumulation of straw, cornstalks and soil would ordinarily be present. As described previously, the soil and litter is emulsified, whereby an earlier benefit is obtained from the fertilizing qualities of the cornstalks, straw, and other like litter.

In the event that an obstruction is met by one of the hammer wheels, for example, a large rock, the clutch formed by the pressure plate and clutch plate (Figure 5) is overridden. As the hammer wheel is moved from contact with the obstruction, the clutch faces are again brought into driving contact with each other and the hammer wheel is rotated.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a plow having a first, a second and a third plow beam, said plow beams having rear ends which are staggered with respect to each other and each being fitted with a plowshare, an attachment comprising a first, a second and a third housing mounted beneath said first, second and third plow beams respectively, brackets suspending said housings from said plow beams, a first, a second and a third shaft mounted for rotation in said housings, each shaft having its rear end protruding therefrom and terminating in advance of the plowshare on said first, second and third plow beams respectively, a gear box carried by said first and second plow beams and having said first and second housings secured thereto, means drivingly connecting said first and second shafts and located in said gear box, a drive shaft operatively connected to said drivingly connecting means for actuation of said first and second shafts, a third shaft in said third housing, means drivingly connecting said second and third shafts so that said third shaft is rotated simultaneously with the riotation of said second shaft, a guard located over the last mentioned drivingly connecting means, said rear end of each of said shafts being located below its respective plow beam, a hammer wheel at said rear end of each of said shafts and comprising a clutch element, an additional clutch element secured to said end of each of said shafts and operatively connected with the first mentioned clutch element.

2. The plow of claim 1 wherein there is a hammer wheel deflector secured to each plow beam and disposed in superposition to one of the hammer wheels.

References Cited in the file of this patent

UNITED STATES PATENTS

| 1,114,839 | Wohlrab | Oct. 27, 1914 |
| 1,697,677 | Davidson | Jan. 1, 1929 |
| 1,846,323 | Elmore | Feb. 23, 1932 |
| 2,051,443 | Gravely | Aug. 18, 1936 |
| 2,670,670 | Allison et al. | Mar. 2, 1954 |
| 2,682,823 | Fey | July 6, 1954 |
| 2,732,783 | Murphy | Jan. 31, 1956 |